Jan. 3, 1956      E. G. MORRISON      2,729,321
ROLLER CONVEYOR CONSTRUCTION
Filed June 4, 1952      3 Sheets-Sheet 1
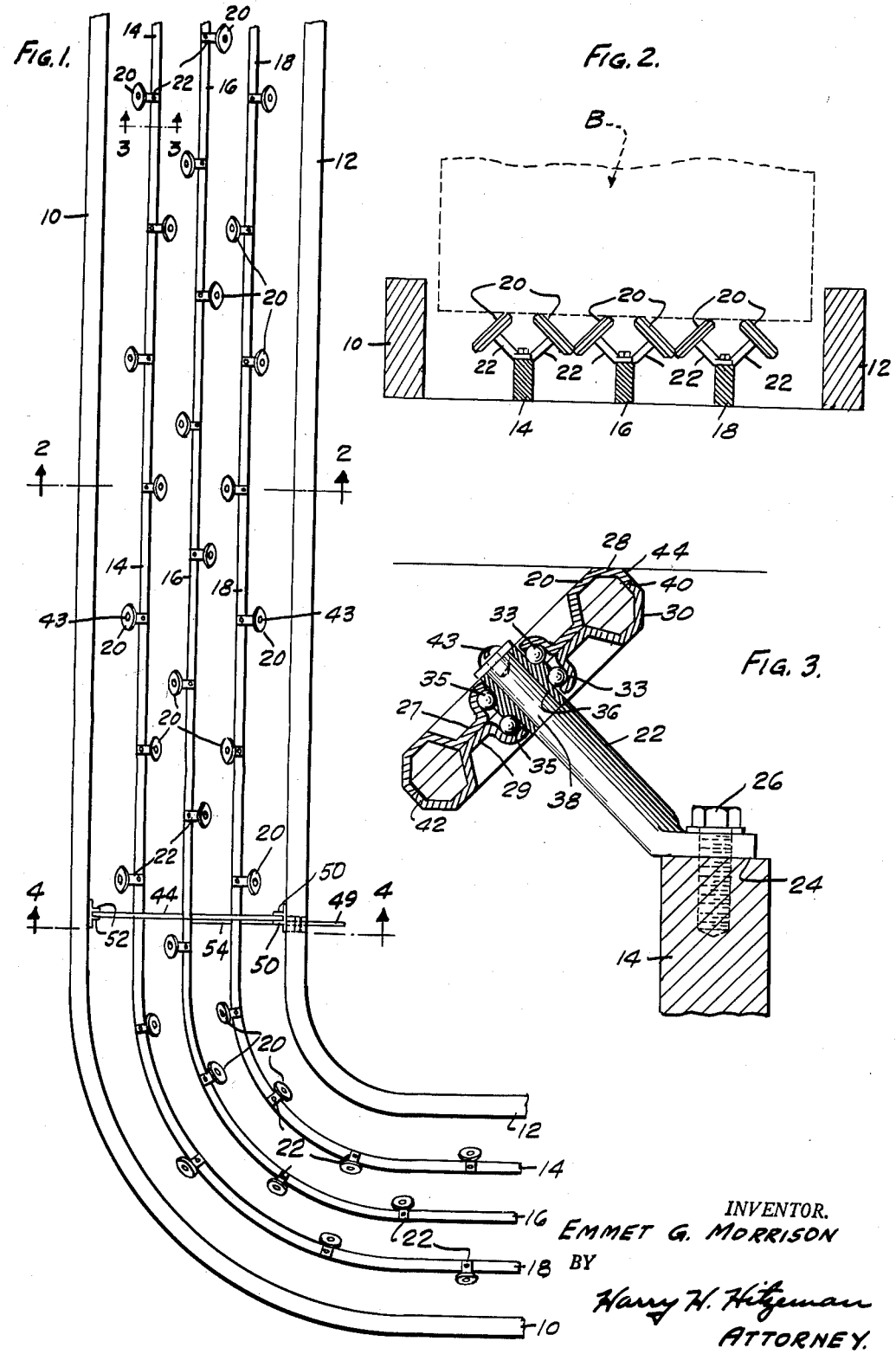
INVENTOR.
EMMET G. MORRISON
BY
Harry H. Hitzeman
ATTORNEY.

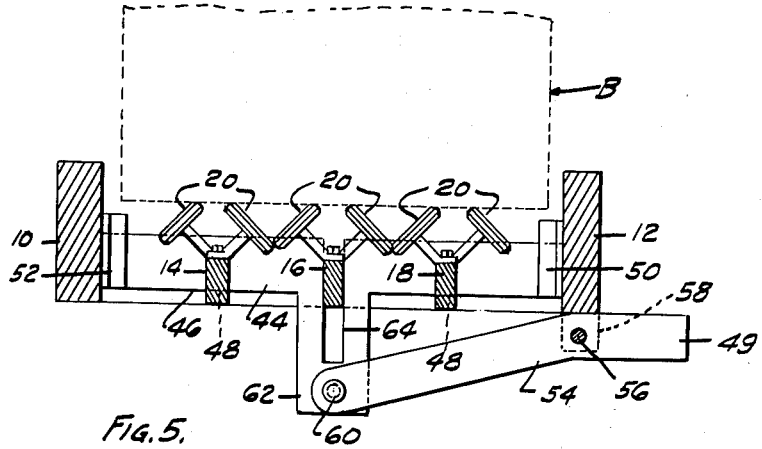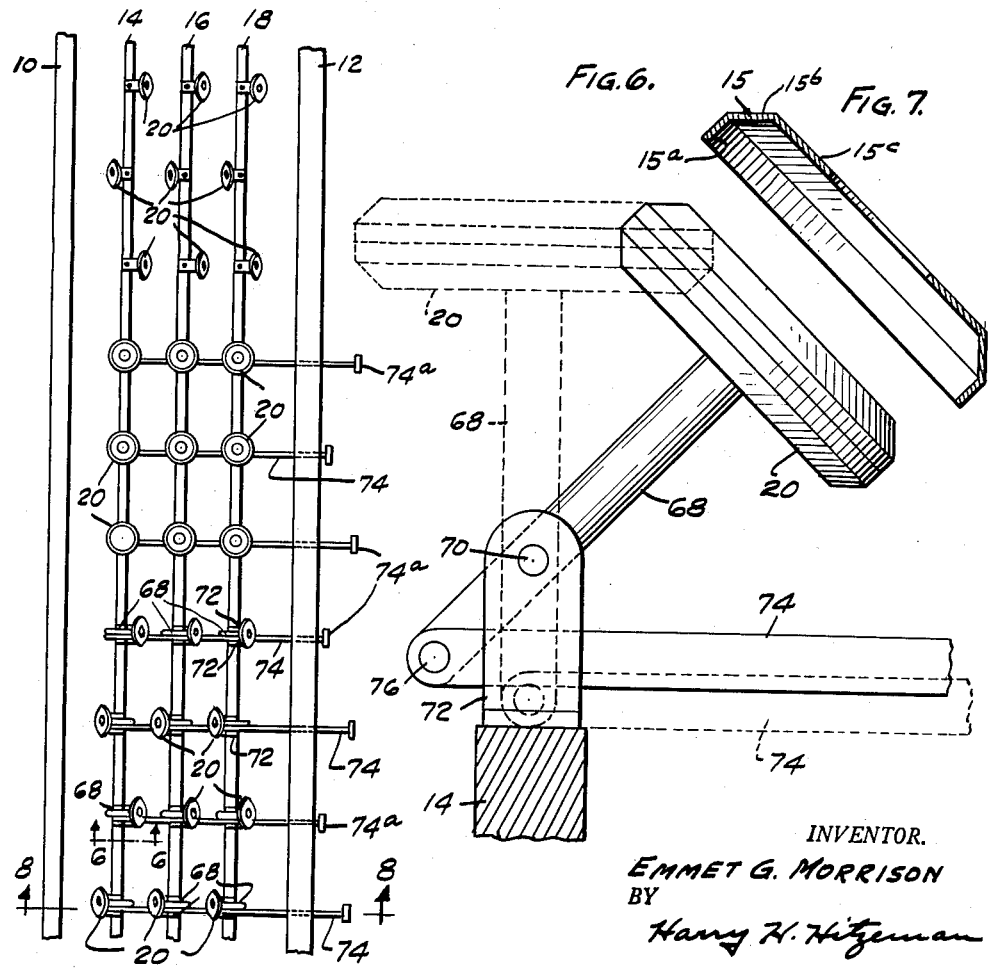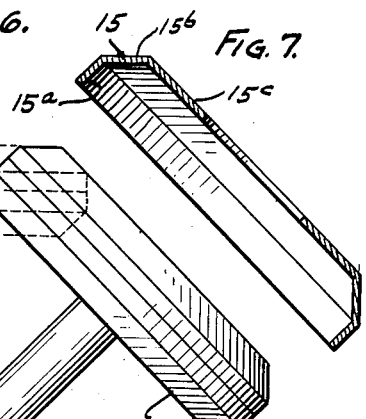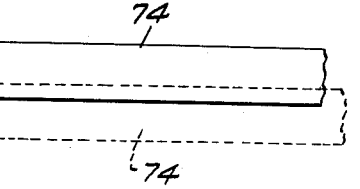

Jan. 3, 1956 E. G. MORRISON 2,729,321
ROLLER CONVEYOR CONSTRUCTION
Filed June 4, 1952 3 Sheets-Sheet 3
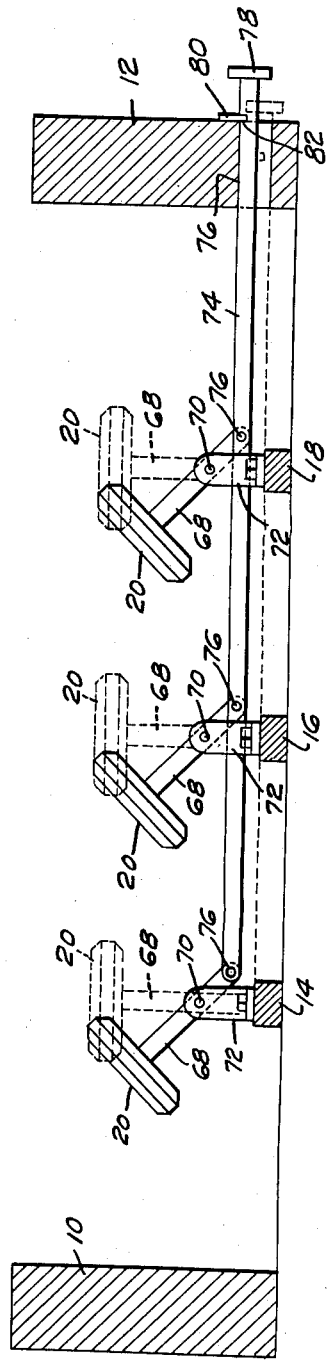
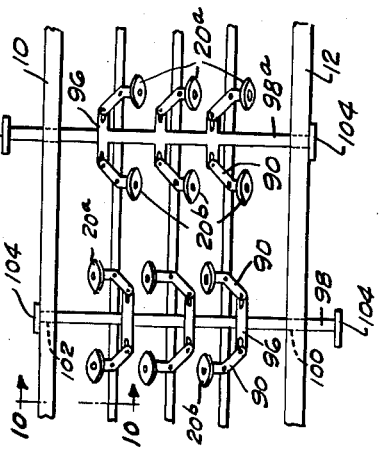
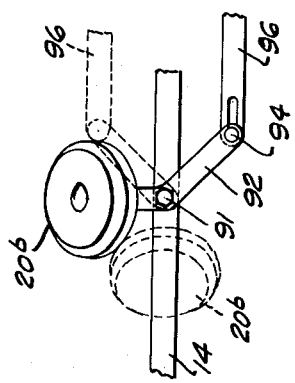
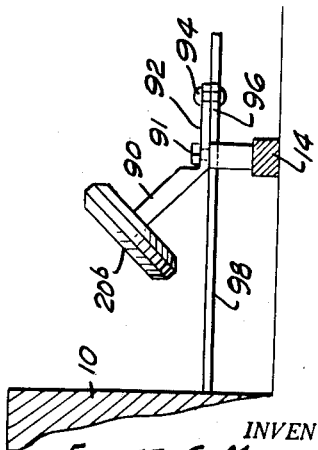
INVENTOR.
EMMET G. MORRISON
BY
Harry H. Hitzeman
ATTORNEY.

United States Patent Office 2,729,321
Patented Jan. 3, 1956

2,729,321

ROLLER CONVEYOR CONSTRUCTION

Emmett G. Morrison, Elgin, Ill.

Application June 4, 1952, Serial No. 291,624

12 Claims. (Cl. 193—35)

My invention relates to improvements in conveyors.

My invention relates more particularly to conveyors for boxes, trays, cartons or similar containers on assembly lines or other places, which conveyors usually employ guide rails and rollers which successively support the conveyed objects to their destination.

The principal object of my invention is the provision of an improved conveyor construction wherein the rollers employed are so arranged that edge contact is made with the objects conveyed.

A further object of the invention is the provision of improved rollers so constructed that when the working edge of a roller becomes worn the roller can be reversed, thus affording double life to each roller.

A further object of the invention is the provision in a conveyor of the type described of support rollers so mounted that they may also act as a brake, when desired, to stop the forward movement of containers or other objects at specific destinations. One method of mounting the rollers for this purpose is by pivotally mounting the roller spindle bolts and providing means for tilting a plurality at the same time.

Another type of construction contemplates provision of a plurality of movable stop plate members mounted across the conveyor between a plurality of rows of rollers at various points throughout the length of the conveyor.

Another type of construction contemplates the pivotal arrangement of support rollers adjustable as desired to completely halt or slow down movement of objects on the conveyor.

The invention further contemplates the provision of providing shoes or covers for each roller whereby the wear from objects being conveyed will be on the shoes or covers thereby insuring longer life to the rollers.

Other objects of the invention will be more apparent from the following description wherein reference is had to the accompanying drawings upon which:

Fig. 1 is a plan view of a section of conveyor track constructed in accordance with my invention;

Fig. 2 is a cross-sectional view thereof taken on the line 2—2 of Fig. 1;

Fig. 3 is a full size view of one of the conveyor rollers taken as a sectional view through one of the lineal supports of the conveyor on the line 3—3 of Fig. 1;

Fig. 4 is a cross-sectional view through the conveyor at one of the brakes or stop members for conveyed articles and is taken on line 4—4 of Fig. 1;

Fig. 5 is a plan view of a section of conveyor track showing a modified form of mounting for the conveyor rollers;

Fig. 6 is a full size view of one of the conveyor rollers taken as a sectional view through one of the lineal supports of the conveyor on the line 6—6 of Fig. 5;

Fig. 7 is a cross-sectional view of a wear cap or shoe which may be placed on individual rollers;

Fig. 8 is a cross-sectional view through the conveyor showing a tandem control for varying the angle of the conveyor rollers taken on line 7—7 of Fig. 5;

Fig. 9 is a plan view of a section of conveyor track showing a further modified form of mounting for the conveyor rollers;

Fig. 10 is a cross-sectional view thereof taken on line 10—10 of Fig. 9 and

Fig. 11 is a fragmentary detail view of one roller mounting with a changed position thereof shown in dotted lines.

In the embodiment of the invention which I have chosen to illustrate and describe the same in Fig. 1, I have shown a conveyor which may include the parallel side frame members 10 and 12 and intermediate lineal supports 14, 16 and 18 generally equally spaced between the side support members 10 and 12.

Conveyor rollers 20 are mounted upon suitable post members 22 at equally spaced intervals on top of each of the support members 14, 16 and 18. The roller posts 22 may be fastened on the top 24 of each of the supports by means of suitable bolt members 26.

The rollers or casters 20 may be of the type which are ordinarily used for roller skates and may be formed from a pair of metal plates 27 and 29 that are blanked to form the tread or flat edge portions 28 and 30. The two metal blanks may be riveted or spot welded together to form the wheel. Each of the blanks is formed with a circular groove 33 to provide an outer groove for a pair of ball bearing races 35 held in place by an inner ring member 36 mounted upon a reduced shank 38 of the post 22.

Each of the metal blanks 27 and 29 has a circular meeting edge 40 and a flat circular tread 42 which connects with the angular edge walls 28 and 30 so that in use the object carried by the wheels is carried on the flat edge wall of the tread of the caster wheels. After one edge 28 of the wheels has become worn it is a simple matter to remove the screw 43 and turn the caster wheel about on the shank 38 of its support post.

By mounting the rollers 20 at an angle of 45° and alternately the positioning of the same upon the lineal supports 14, 16 and 18 a conveyor can be built up which will provide a smooth and effective path for boxes or other objects to be moved about.

In order to provide a break or stopping place for objects being moved forward on the conveyor I provide a transversely mounted plate member 44 which may have its lower edge 46 supported in its lower position in suitable slots 48 in the lineal supports 14 and 18. The stop plate may be guided further by angle members 50 and 52 mounted on the inside wall of the side rails 10 and 12. For raising the stop plate 44, I provide a hand lever 54 mounted upon a pivot 56 in a bracket 58 connected to the bottom of the side wall 12.

The end of the lever 54 may be pivotally connected at 60 to an arm 62 extending downwardly from the stop plate 44. The arm 62 has a vertical open ended slot 64 which embraces the lineal support 16. With this construction, when it is desired to stop the forward movement of an object such as the box B shown on dotted line in Fig. 4, the handle 49 of the lever 54 is pushed downwardly and the stop plate 44 will be raised to the level of the side rails. Thus objects will be effectively stopped at this point.

In Fig. 5, I have shown a modified construction of conveyor which may include angularly disposed support rollers 20 mounted upon the lineal supports 14, 16 and 18. Alternate rows of rollers 20 may be angularly disposed in opposite direction. While in the drawings, I have shown the rollers mounted at a 45° angle, it will be understood that this may be varied, if desired.

I have provided means for tilting the conveyor rollers to a horizontal position so that boxes or other objects being moved forward thereon may be stopped wherever desired. For this purpose the roller post members 68 may be mounted upon pivots 70 supported in suitable brackets 72 on top of the lineal supports 14, 16 and 18. Means for tilting the rollers 20 to a horizontal position may include an operating lever 74 connected to the pivots 76 at the ends of the roller posts 68. The lever 74 may extend through a slot 76 in the side wall 12 and have a handle 78 at the end of the same.

The lever is normally held in the position held in Fig. 8 by means of a latch 80 which engages a notch 82 in the top wall of the lever 74. To shift the rollers 20 from the 45° angle to a horizontal position the lever 74 is unlatched and moved forward to swing the rollers to a horizontal position. To swing the rollers in alternate rows to a horizontal position the lever 74A is pulled forward. In this way, as many rows of rollers as is desired may be swung to a horizontal position to effect a stop of any desired length to the forward movement of objects upon the conveyor.

In Fig. 7 I have shown a cap or shoe 15 which may be stamped from a sheet metal blank having the peripheral ledge 15a, an angular edge portion 15b and bottom wall 15c of a size so that it will frictionally fit over the rollers 20. By the use of caps 15 upon the rollers 20 it can be seen that the life of the rollers will be greatly increased since when the caps are worn out, they may be thrown away and new ones used.

In Figs. 9 to 11, I have shown a further modified form of construction wherein I employ tandem sets of rollers 20a and 20b mounted upon support posts 90. Each of the support posts 90 may have a horizontal arm 92 extending angularly therefrom, the arms being pivotally connected by pins 94 to cross arms 96 on operating lever 98. The operating lever 98 may extend through openings 100 and 102 in the side rails 12 and 10 respectively, each lever having a handle 104 on each end of the same.

With this construction when it is desired to stop the forward movement of an object on the conveyor, an operating lever 98 is pushed forward (see Fig. 9) to move the three rollers 20b to the dotted line position shown in Fig. 11. In the same way if operating lever 98a is pulled down (see Fig. 9) the series of support posts connected to the arm 96 will pivot the two sets of rollers about their pivots 91 and these sets of rollers will be directed transversely of the conveyor to stop the forward movement of objects on the conveyor.

From the foregoing description, it can be seen that I have provided a conveyor construction wherein the maximum wear and efficiency of the rollers is obtained, by reason of the fact that edge contact only is made on the rollers by objects being transported by the conveyor. Further since only edge contact and wear is effected, all rollers can be reversed on their support posts to provide double life for the same.

An effective braking system for stopping the forward movement of objects on the conveyor has been provided. While in the drawings only a manual means of operating the braking means is shown, it will be understood that the operation of the same may be automatic by any well-known control means.

By swiveling the roller posts, the rollers may be swung in a desired arc or completely 90° to absolutely stop movement of articles thereover. When swung only slightly about their pivots, they act as brake to reduce speed of movement of articles moving forward.

It will, of course, be understood that brakes or stop members may be located wherever desired in the conveyor system, also, while a tandem arrangement for two rows of rollers is shown, the number which may be connected in tandem is limited only by mechanical expediency.

While I have illustrated and described a specific embodiment of my invention and certain modifications thereof, it will be apparent to those skilled in the art that changes and modifications may be made in the specific details set forth, and I do not wish to be limited in any particular; rather, what I desire to secure and protect by United States Letters Patent is:

1. Roller conveyor construction including a pair of side rails, a plurality of lineal supports between said side rails and rows of rollers mounted on each of said lineal supports, the rollers in each row being alternately turned on an angle so that articles supported thereon ride upon an edge of the same.

2. Roller conveyor construction including a pair of side rails, a plurality of lineal supports between said side rails and a plurality of rows of rollers mounted on each of said lineal supports, the rollers in each row being alternately turned on an angle so that articles supported thereon ride upon an edge of the same, each of said rollers being individually mounted and equally spaced throughout the length of each support.

3. Roller conveyor construction including a pair of side rails, a plurality of lineal supports between said side rails and spaced rollers mounted on each of said lineal supports, said rollers being mounted at a 45° angle alternately to the right and to the left so that articles supported thereon ride upon an edge of the same, said rollers having flattened edges.

4. Roller conveyor construction including a pair of side rails, a plurality of lineal supports between said side rails and spaced rollers mounted on each of said lineal supports, said rollers being mounted at a 45° angle alternately to the right and to the left so that articles supported thereon ride upon an edge of the same, said rollers having flattened edges and transverse stop plates mounted between said side rails for stopping movement of objects on said conveyor said stop plates being operated to raise or lower in a straight line and guide means on said side rails for directing said stop plates.

5. Roller conveyor construction including a pair of side rails, a plurality of lineal supports between said side rails and spaced rollers pivotally mounted on each of said lineal supports, said rollers being mounted at a 45° angle alternately to the right and to the left so that articles supported thereon ride upon an edge of the same, said rollers having flattened edges, and means associated with transversely aligned rollers for turning the same to a horizontal plane.

6. Roller conveyor construction including a pair of side rails, a plurality of lineal supports between said side rails and spaced rollers pivotally mounted on each of said lineal supports, said rollers being mounted at a 45° angle alternately to the right and to the left so that articles supported thereon ride upon an edge of the same, said rollers having flattened edges, and means associated with transversely aligned rollers for turning the same to a horizontal plane, said means including pivoted roller support posts and an arm connected to a row of transversely aligned support posts.

7. Roller conveyor construction including a pair of side rails, a plurality of lineal supports between said side rails and spaced rollers pivotally mounted on each of said lineal supports, said rollers being mounted at a 45° angle to said supports alternately to the right and to the left of the same so that articles supported thereon ride upon an edge of the same, said rollers having flattened edges and said rollers capable of being swung around their pivotal mounting to a 45° angle transverse to said lineal supports.

8. The combination with a roller conveyor construction including side rails and parallel lineal support rails spaced between said side rails, each of said lineal support rails having angularly disposed rollers at spaced points thereon and conveyed article stopping means comprising transverse rail members normally below the path of travel of conveyed articles and means for raising said rails above the level of said rollers, vertically disposed facing channel members mounted on the inside walls of said side rails, said transverse rail members guided in said channel member.

9. Roller conveyor construction including a pair of side rails, a plurality of lineal supports between said side rails and spaced rollers pivotally mounted on each of said lineal supports, said rollers being mounted at a 45° angle to said supports alternately to the right and to the left of the same so that articles supported thereon ride upon an edge of the rollers, each of said rollers having flattened edges, and means for swiveling each of said rollers about its pivot, each of said rollers mounted on a pivoted post, said means including an operating lever, an arm on said lever extending at right angles therefrom, said arm connected at its end to one of said roller posts.

10. Roller conveyor construction including a pair of parallel spaced side rails, a plurality of support rails between said side rails and spaced rollers pivotally mounted on each of said support rails, said rollers being mounted at a 45° angle to said rails and alternately to the right and to the left of the same so that articles supported thereon ride upon an edge of the rollers, each of said rollers having flattened edges and means for swiveling a plurality of said rollers about their pivots, each of said rollers mounted on a pivoted post, said means including an operating lever, arms on said lever extending at right angles therefrom, said arms connected at their ends to said roller posts.

11. A conveyor comprising elongated parallel side rails, elongated parallel support rails spaced between said side rails, support posts pivotally mounted at spaced intervals thruout the length of said support rails, rollers on said support posts, an arm extending at an angle from each of said posts, an operating lever mounted in said side rails between parallel rows of rollers, an arm extending at right angles thereto and pivotally connected to the arms on said support posts on both sides of the same for swiveling two rows of rollers simultaneously.

12. A conveyor comprising elongated parallel side rails, elongated parallel support rails spaced between said side rails, support posts pivotally mounted in rows at spaced intervals thruout the length of said support rails, a roller on each of said support posts, an operating lever mounted in said side rails between parallel rows of rollers, a plurality of arms extending sideways therefrom, said arms pivotally connected to the arms on said support posts on both sides of the same for swiveling a plurality of rows of rollers simultaneously.

References Cited in the file of this patent
UNITED STATES PATENTS

| | | |
|---|---|---|
| 902,736 | Jennings | Nov. 3, 1908 |
| 907,100 | Zamboni | Dec. 15, 1908 |
| 1,232,882 | Alvey | July 10, 1917 |
| 2,309,723 | Wilson | Feb. 2, 1943 |